(12) United States Patent
Meng et al.

(10) Patent No.: US 11,221,517 B2
(45) Date of Patent: Jan. 11, 2022

(54) LIQUID CRYSTAL DISPLAY APPARATUS AND FABRICATING METHOD THEREOF, BACK LIGHT AND FABRICATING METHOD THEREOF

(71) Applicant: BOE Technology Group Co., Ltd., Beijing (CN)

(72) Inventors: Xiandong Meng, Beijing (CN); Wei Wang, Beijing (CN); Xiaochuan Chen, Beijing (CN); Jifeng Tan, Beijing (CN); Xianqin Meng, Beijing (CN); Jian Gao, Beijing (CN); Fangzhou Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 447 days.

(21) Appl. No.: 16/336,982

(22) PCT Filed: Mar. 7, 2018

(86) PCT No.: PCT/CN2018/078281
§ 371 (c)(1),
(2) Date: Mar. 27, 2019

(87) PCT Pub. No.: WO2019/169577
PCT Pub. Date: Sep. 12, 2019

(65) Prior Publication Data
US 2021/0341790 A1 Nov. 4, 2021

(51) Int. Cl.
*G02F 1/13357* (2006.01)
*G02F 1/1335* (2006.01)

(52) U.S. Cl.
CPC ............... *G02F 1/133606* (2013.01); *G02F 1/133516* (2013.01); *G02F 1/133605* (2013.01)

(58) Field of Classification Search
CPC ......... G02F 1/133606; G02F 1/133516; G02F 1/133605
See application file for complete search history.

(56) References Cited

U.S. PATENT DOCUMENTS

| 5,615,024 A | 3/1997 | May et al. |
| 2012/0268809 A1* | 10/2012 | Guo .................. G02B 5/288 |
| | | 359/359 |

(Continued)

FOREIGN PATENT DOCUMENTS

| CN | 102854694 A | 1/2013 |
| CN | 105842925 A * | 8/2016 ............ G02B 30/27 |

(Continued)

OTHER PUBLICATIONS

International Search Report & Written Opinion dated Dec. 7, 2018, regarding PCT/CN2018/078281.

(Continued)

*Primary Examiner* — Donald L Raleigh
(74) *Attorney, Agent, or Firm* — Intellectual Valley Law, P.C.

(57) ABSTRACT

The present application discloses a liquid crystal display apparatus and a fabricating method thereof, a back light and a fabricating method thereof. The liquid crystal display apparatus includes a base substrate; a liquid crystal layer; and an anisotropic grating on a side of the liquid crystal layer distal to the base substrate. The anisotropic grating includes a plurality of barriers and a plurality of slits arranged alternately. The anisotropic grating is configured to separate incident light into light of a first color, light of a second color, and light of a third color, and configured to emit the light of the first color, the light of the second color, and the light of the third color at different exit angles, respectively.

36 Claims, 8 Drawing Sheets

(56) References Cited

U.S. PATENT DOCUMENTS

2014/0085553 A1    3/2014    Chen et al.
2019/0011735 A1    1/2019    Tan et al.

FOREIGN PATENT DOCUMENTS

| CN | 105842925 A |   | 8/2016  |           |
|----|-------------|---|---------|-----------|
| CN | 106291943 A |   | 1/2017  |           |
| CN | 106292124 A | * | 1/2017  | G02F 1/1334 |
| CN | 106292124 A |   | 1/2017  |           |
| JP | 2000241812 A |  | 9/2000  |           |
| WO | 2006120638 A2 | | 11/2006 |           |

OTHER PUBLICATIONS

Copy of the Extended European Search Report in the European Patent Application No. 189084213, dated Sep. 21, 2021.

* cited by examiner

LIQUID CRYSTAL DISPLAY APPARATUS AND FABRICATING METHOD THEREOF, BACK LIGHT AND FABRICATING METHOD THEREOF

CROSS-REFERENCE TO RELATED APPLICATION

This application is a national stage application under 35 U.S.C. § 371 of International Application No. PCT/CN2018/078281, filed Mar. 7, 2018, the contents of which are incorporated by reference in the entirety.

TECHNICAL FIELD

The present invention relates to display technology, more particularly, to a liquid crystal display apparatus and a method of fabricating a liquid crystal display apparatus.

BACKGROUND

A liquid crystal display apparatus includes an array substrate and a color filter substrate assembled together, and a liquid crystal layer between the array substrate and the color filter substrate. The liquid crystal layer includes liquid crystal molecules. A liquid crystal display device produces an image by applying an electric field to a liquid crystal layer between the array substrate and the color filter substrate. In response to the electric field applied to tire liquid crystal layer, the liquid crystal molecules in the liquid crystal layer rotate. Thus, the electric field changes an alignment direction of the liquid crystal molecules in the liquid crystal layer. Light transmittance of the liquid crystal layer is adjusted when tire alignment direction of the liquid crystal molecules changes.

SUMMARY

In one aspect, the present invention provides a liquid crystal display apparatus comprising a base substrate; a liquid crystal layer; and an anisotropic grating on a side of the liquid crystal layer distal to the base substrate and comprising a plurality of barriers and a plurality of slits arranged alternately, the anisotropic grating is configured to separate incident light into light of a first color, light of a second color, and fight of a third color, and configured to emit the light of the first color, the light of tire second color, and the fight of the third color at different exit angles, respectively, wherein the anisotropic grating comprises an anisotropic optical material in the plurality of slits, the anisotropic optical material has a first refractive index for a transverse magnetic component of the incident light and a second refractive index for a transverse electric component of the incident light, the first refractive index being different from the second refractive index.

Optionally, the anisotropic grating is configured to selectively diffract the transverse magnetic component of the incident light into the liquid crystal layer and selectively block the transverse electric component of the incident light from entering into the liquid crystal layer.

Optionally, the plurality of barriers are made of a non-anisotropic optical material, and have a refractive index substantially same as an ordinary ray refractive index of the anisotropic optical material; the first refractive index is greater than the ordinary ray refractive index of the anisotropic optical material and equal to or less than an extraordinary ray refractive index of the anisotropic optical material; and the second refractive index is substantially same as the ordinary my refractive index of the anisotropic optical material.

Optionally, the liquid crystal display apparatus further comprises a polarizer on a side of the liquid crystal layer distal to the anisotropic grating; wherein the liquid crystal display apparatus is absent of any polarizer on a side of the liquid crystal layer distal to the base substrate.

Optionally, the liquid crystal display apparatus further comprises a light, guide plate on a side of the anisotropic grating distal to the liquid crystal layer and configured to transmit light into the anisotropic grating.

Optionally, a refractive index of the light guide plate is substantially same as a refractive index of the plurality of barriers.

Optionally, the refractive index of the light guide plate is substantially same as an ordinary ray refractive index of the anisotropic optical material.

Optionally, the plurality of barriers are made of a non-anisotropic optical material, and have a refractive index substantially same as the ordinary ray refractive index of the anisotropic optical material and substantially same as the refractive index of the light guide plate; the first refractive index is greater than, the ordinary ray refractive index of the anisotropic optical material and equal to or less than an extraordinary ray refractive index of the anisotropic optical material; and the second refractive index is substantially same as the ordinary ray refractive index of the anisotropic optical material.

Optionally, the liquid crystal display apparatus further comprises one or mom light sources; and a reflective mirror configured to collimate light from the one or more light sources into substantially collimated light; wherein the light guide plate is configured to receive the substantially collimated light from one or more lateral skies of the light guide plate, and configured, to transmit light into the anisotropic grating through a top side of the light guide plate.

Optionally, the liquid crystal display apparatus further comprises one or more light sources on a side of the light guide plate distal to the anisotropic grating; wherein the light guide plate is configured to receive light from the one or more light sources from a bottom side of the light guide plate, and configured to transmit light in to the anisotropic grating though a top side of the light guide plate, the top side being substantially opposite to the bottom side.

Optionally, the liquid crystal display apparatus fruitier comprises a lens array between the anisotropic grating and the liquid crystal layer and comprising a plurality of lenses configured to focus the light of the first color into a subpixel of the first color, the light of the second color into a subpixel of the second color, and the light of the third color into a subpixel of the third color.

Optionally, each of the plurality of lenses corresponds to three adjacent subpixels including the subpixel of the fir st color, the subpixel of the second color, and the subpixel of the third color; and each of the plurality of lenses is configured to focus the fight of the fir st color into the subpixel of the first color of the three adjacent subpixels, the light of the second color into the subpixel of the second color of the three adjacent subpixels, and the light of the third color into the subpixel of the third color of the three adjacent subpixels.

Optionally, the liquid crystal display apparatus further comprises an intermediate layer between the anisotropic grating and the lens array.

Optionally, the liquid crystal display apparatus further comprises a light guide plate on a side of the anisotropic grating distal to the liquid crystal layer and configured to transmit light into the anisotropic grating; wherein the intermediate layer has a refractive index less than a refractive index of the light guide plate.

Optionally, the liquid crystal display apparatus is absent of any color filter.

Optionally, the liquid crystal display apparatus further comprises a color filter, the color filter comprising a plurality of first color filter blocks, a plurality of second color filter blocks, and a plurality of third color filter blocks.

Optimally, the liquid crystal display apparatus farther comprises a leas array between the anisotropic grating and the liquid crystal layer and comprising a plurality of lenses; wherein the plurality of lenses are configured to focus the light of the first color into a plane containing the color filter in a region corresponding to the plurality of first color filter blocks, the light of the second color into the plane containing the color filter in a region corresponding to the plurality of second color filter blocks, and the light of the third color in to the plane containing the color filter in a region corresponding to the plurality of third color filter blocks.

Optionally, the anisotropic optical material comprises a liquid crystal molecule.

Optionally, the fight of the first color, the fight of the second color, and the light of the third color are a green light, a blue light, and a red light, respectively.

In another aspect, the present invention provides a back light for a liquid crystal display panel comprising one or more light sources; an anisotropic grating including a plurality of barrier's and a plurality of slits arranged alternately; wherein the anisotropic grating is configured to separate incident light into light of a first color, light of a second color, and light of a third color, and configured to emit the light of the first color, the light of the second color, and the light of the third color at different exit angles, respectively, and the anisotropic grating comprises an anisotropic optical material in the plurality of slits, the anisotropic optical material has a first refractive index for a transverse magnetic component of the incident light and a second refractive index for a transverse electric component of the incident light, the first refractive index being different from the second refractive index.

Optionally, the anisotropic grating is configured to selectively diffract the transverse magnetic component of the incident light, and selectively block the transverse electric component of the incident light.

Optionally, the plurality of barriers are made of a non-anisotropic optical material, and have a refractive index substantially same as an ordinary ray refractive index of the anisotropic optical material; the first refractive index is greater than the ordinary ray refractive index of the anisotropic optical material and equal to or less than an extraordinary ray refractive index of the anisotropic optical material; and the second refractive index is substantially same as the ordinary ray refractive index of the anisotropic optical material.

Optimally, the back light further comprises a light guide plate configured to transmit light into the anisotropic grating.

Optionally, a refractive index of the light guide plate is substantially same as a refractive, index of the plurality of barriers.

Optionally, the refractive index of the light guide plate is substantially same as an ordinary my refractive index of the anisotropic optical material.

Optionally, the plurality of barriers are made of a non-anisotropic optical material, and have a refractive index substantially same as the ordinary ray refractive index of the anisotropic optical material and substantially same as the refractive index of the light guide plate; the first refractive index is greater than the ordinary ray refractive index of the anisotropic optical material and equal to or less than an extraordinary ray refractive index of the anisotropic optical material; and the second refractive index is substantially same as the ordinary my refractive index of the anisotropic optical material.

Optionally, the back light further comprises a reflective mirror configured to collimate light from the one or more light sources into substantially collimated light; wherein the light guide plate is configured to receive the substantially collimated light from one or more lateral sides of the light guide plate, and configured to transmit light into the anisotropic grating through a top side of the light guide plate.

Optionally, the one or more light sources are on a side of the light guide plate distal to the anisotropic grating; and the light guide plate is configured to receive light from the one or more light sources from a bottom side of the light guide plate, and configured to transmit light into the anisotropic grating through a top side of the light guide plate, the top side being substantially opposite to the bottom side.

Optionally, the back light further comprises a lens array on a side of the anisotropic grating distal to the one or more light sources and comprising a plurality of lenses configured to focus the light of the first color into a first position, the light of the second color into a second position, and the light of the third color in to a third position.

Optionally, each of the plurality of lenses corresponds to three adjacent positions including the first position, the second position, and the third position; and each of the plurality of lenses is configured to focus the light of the first color into the first position of the three adjacent positions, the light of the second color into the second position of the three adjacent positions, and the light of the third color into the third position of fee three adjacent positions.

Optionally, the back light further comprises an intermediate layer between the anisotropic grating and the lens array.

Optionally, the back light further comprises a light guide plate on a side of the anisotropic grating distal to the intermediate layer and configured to transmit light into fee anisotropic grating; wherein the intermediate layer has a refractive index less than a refractive index of the light guide plate.

Optionally, the anisotropic optical material comprises a liquid crystal molecule.

Optionally, the light of the first color, the light of the second color, and the light of the third color are a green light, a blue light, and a red light, respectively.

In another aspect, the present invention provides a method of fabricating a liquid crystal display apparatus, comprising forming a liquid crystal layer on a base substrate; and forming an anisotropic grating on a side of the liquid crystal layer distal to the base substrate and comprising a plurality of barriers and a plurality of slits arranged alternately, the anisotropic grating is configured to separate incident fight into light of a first color, light of a second color, and light of a third color, and configured to emit the light of the first color, the light of tire second color, and the fight of the third color at different exit angles, respectively; wherein the anisotropic grating is formed to comprise an anisotropic optical material in the plurality of slits, the anisotropic optical material has a first refractive index for a transverse magnetic component of the incident light and a second refractive index for a transverse electric component of the incident light, the first refractive index being different from the second refractive index.

In another aspect, the present invention provides a method of fabricating a back light, for a liquid crystal display panel, comprising forming an anisotropic grating; wherein forming the anisotropic grating comprises forming a plurality of barrier's and a plurality of slits arranged alternately; the anisotropic grating is formed to separate incident light into light of a first color, light of a second color, and light of a third color, and formed to emit the light of the fir st color, the light of the second color, and the light of the third color at different exit angles, respectively; and the anisotropic grating is formed to include an anisotropic optical material in the plurality of slits, the anisotropic optical material has a first refractive index for a transverse magnetic component of the incident light and a second refractive index for a transverse electric component of the incident light, the first refractive-index being different from the second refractive index.

BRIEF DESCRIPTION OF THE FIGURES

Tire following drawings are merely examples for illustrative, purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional liquid crystal display apparatus, a color filter is used for color display. The color filter includes a plurality of color filter blocks, such as red color filter blocks, green color filter blocks, and blue color filter blocks. Tire backlight for illuminating the liquid crystal display apparatus typically emits a white light. Each color filter block filters light of only one color (e.g., a red color) transmitting through the color filter block. Light of other color's are blocked by the color filter block. Thus, the use of the color filter results hi light loss of approximately 70% or higher. To achieve a certain brightness level, a relatively high energy is required for the conventional liquid crystal display apparatus.

Accordingly, tire present disclosure provides, inter alia, a liquid crystal display apparatus and a method of fabricating a liquid crystal display apparatus that substantially obviate one or more of the problems due to limitations and disadvantages of the related art. In one aspect, the present disclosure provides a liquid crystal display apparatus. In some embodiments, the liquid crystal display apparatus includes a base substrate; a liquid crystal layer; and an anisotropic grating on a side of the liquid crystal layer distal to the base substrate. Optionally, the anisotropic grating includes a plurality of barriers and a plurality of slits arranged alternately. Optionally, the anisotropic grating is configured to separate incident light into light of a first color, light of a second color, and light of a third color, and configured to emit the light of the first color, the light of the second color, and the light of the thud color at different exit angles, respectively.

Figure 1:
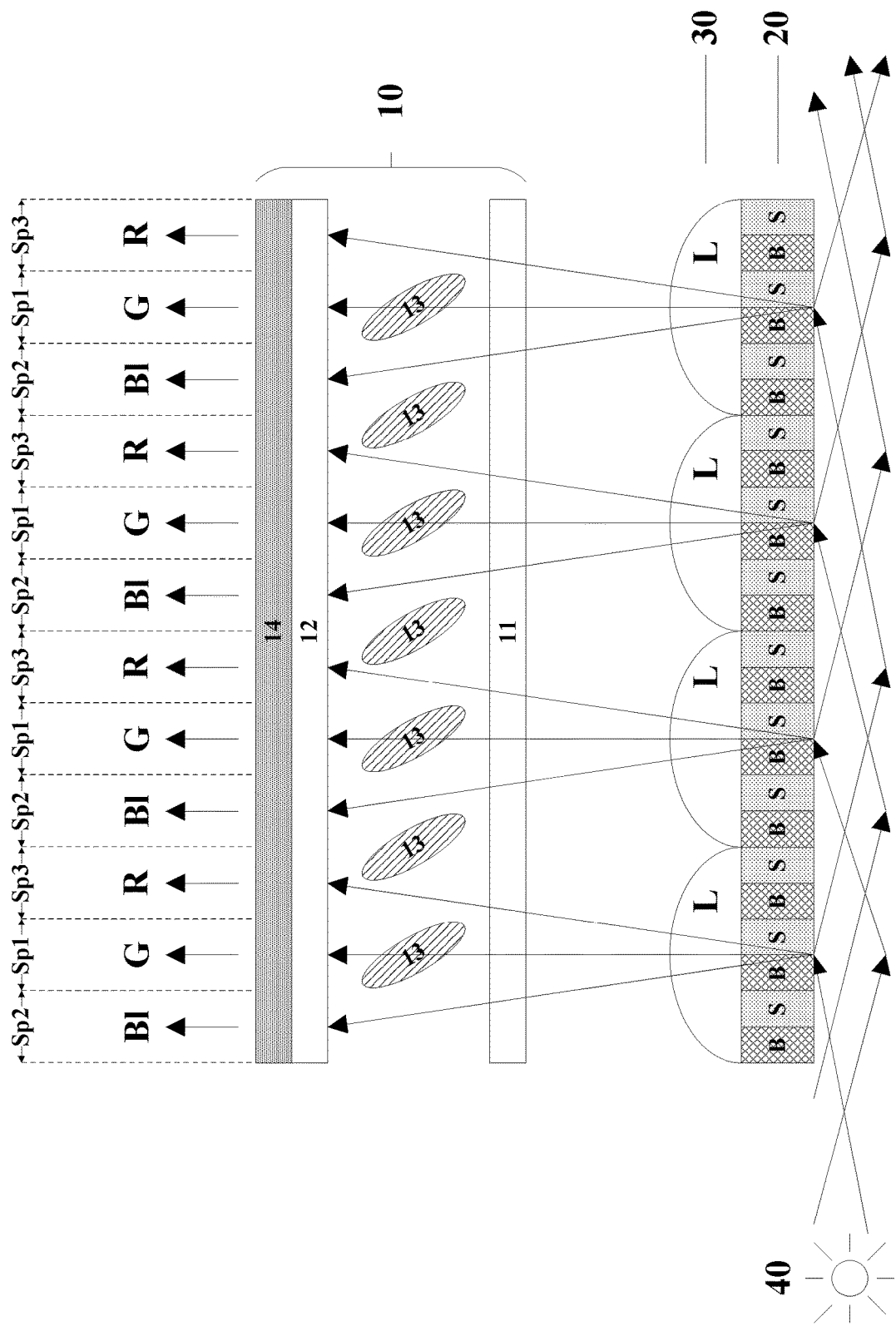
FIG. 1 is a schematic diagram illustrating the structure of a liquid crystal display apparatus in some embodiments according to the present disclosure.

FIG. 1 is a schematic diagram illustrating the structure of a liquid crystal display apparatus in some embodiments according to the present disclosure. Referring to FIG. 1, the liquid crystal display apparatus in some embodiments includes a liquid crystal display module 10 and an anisotropic grating 20. The liquid crystal display module 10 includes a first base substrate 11, a second base substrate 12 facing the first base substrate 11, and a liquid crystal layer 13 between the first base substrate 11 and the second base substrate 12. The anisotropic grating 20 is on a side of the fir st base substrate 11 distal to the second base substrate 12, and includes a plurality of barriers B and a plurality of slits S arranged alternately. The anisotropic grating 20 is configured to separate incident light from a light so wee 40 into light of a first color, light of a second color, and light of a third color, and configured to emit the light of the first color, the light of the second color, and the light of the third color at different exit angles, respectively. As shown in FIG. 1, in some embodiments, the anisotropic grating 20 is configured to separate incident light into a blue light Bl, a green tight G, and a red light R. The anisotropic grating 20 is configured to emit the blue light Bl, the green light G, and the red light R at different exit angles.

Figure 2:
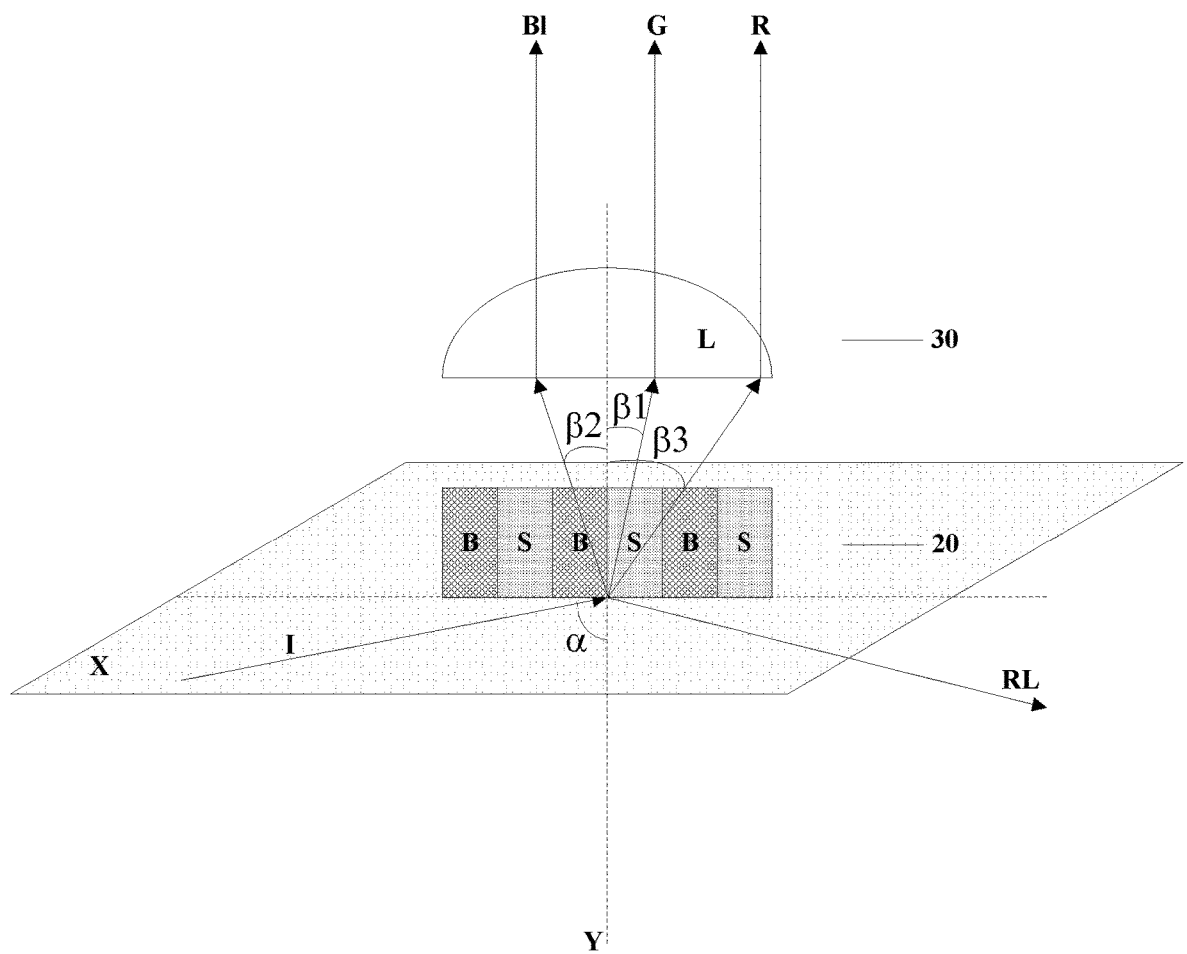
FIG. 2 is a schematic diagram illustrating light path of an incident light passing through an anisotropic grating of a liquid crystal display apparatus in some embodiments according to the present disclosure.

FIG. 2 is a schematic diagram illustrating light path of an incident light passing through an anisotropic grating of a liquid crystal display apparatus in some embodiments according to the present disclosure. Referring to FIG. 2, an incident light I is transmitted onto a surface of the anisotropic grating 20 at an angle of incidence α, a first part of the incident light I is reflected (e.g., by the anisotropic grating 20 or at an interface of the anisotropic glaring 20 and a light guide plate adjacent to the anisotropic grating 20), and a second part of the incident light I is separated by the anisotropic grating 20 into at least three light of different colors, e.g., light of a first color, light of a second color, and light of a third color. In some embodiments, the incident light is a white light. Optionally, the incident light is a compound light of a red light, a green light, and a blue light. As shown in FIG. 1 and FIG. 2, in some embodiments, the second part of the incident light I is separated by the anisotropic grating 20 into at least a blue light Bl, a green light G, and a red light R. The exit angle of light separated by the anisotropic grating 20 can lie determined according to Equation (1):

$$n_1 \sin \alpha + n_2 \sin \beta = m\lambda/p \qquad (1);$$

wherein $n_1$ is a refractive index of a media in which the incident light I is transmitted, $n_2$ is a refractive index of a media in which the light separated by the anisotropic grating 20 is transmitted (e.g., a refractive index of a lens array 30 or an intermediate layer on a side of the anisotropic grating 20 proximal to the first base substrate 11), $\alpha$ is the angle of incidence of the incident light I relative to a line Y normal to a plane X containing a surface of the anisotropic grating 20 (or a plane containing an interface of the anisotropic grating 20 and a light guide plate adjacent to the anisotropic grating 20), $\beta$ is an angle of diffraction of light relative to line Y, p is a pitch of the anisotropic grating 20, $\lambda$ is a wavelength of light separated by the anisotropic grating 20 (exit light), and m is diffraction order's. Optionally, m=0, ±1, ±2, . . . . Optionally, m=1. Optionally, m=−1. Thus, the angle of diffraction of light separated by the anisotropic grating 20 is correlated to its wavelength. Referring to FIG. 2, the second part of the incident light I is separated by the anisotropic grating 20 into at least a blue light BL a green light G, and a red light R. The green light has an angle of diffraction $\beta1$, the blue light has an angle of diffraction $\beta2$, and the red light has an angle of diffraction $\beta3$. Optionally, the angle of incidence $\alpha$ is in a range of approximately 50 degrees to approximately 90 degrees, e.g., approximately 60 degrees to approximately 90 degrees, approximately 65 degrees to approximately 90 degrees, approximately 70 degrees to approximately 90 degrees, and approximately 75 degrees to approximately 90 degrees. Optionally, the angle of diffraction $\beta1$ is in a range of approximately −5 degrees to approximately +5 degrees. Optionally, the angle of diffraction $\beta1$ is in a range of approximately −2 degrees to approximately +2 degrees. Optionally, the angle of diffraction $\beta1$ is in a range of approximately −1 degrees to approximately +1 degrees. Optionally, the angle of diffraction $\beta1$ is substantially zero. Optionally, the angle of diffraction $\beta2$ is in a range of approximately −20 degrees to approximately −5 degrees. Optionally, the angle of diffraction $\beta2$ is in a range of approximately −15 degrees to approximately −10 degrees. Optionally, the angle of diffraction $\beta3$ is in a range of approximately +20 degrees to approximately +5 degrees. Optionally, the angle of diffraction $\beta3$ is in a range of approximately +15 degrees to approximately +10 degrees. Optionally, the blue light Bl and the red light R are emitted out of the anisotropic grating 20 at symmetric exit angles relative to the hue Y, e.g., absolute values of the angle of diffraction $\beta2$ and the angle of diffraction $\beta3$ are substantially the same.

Figure 3:
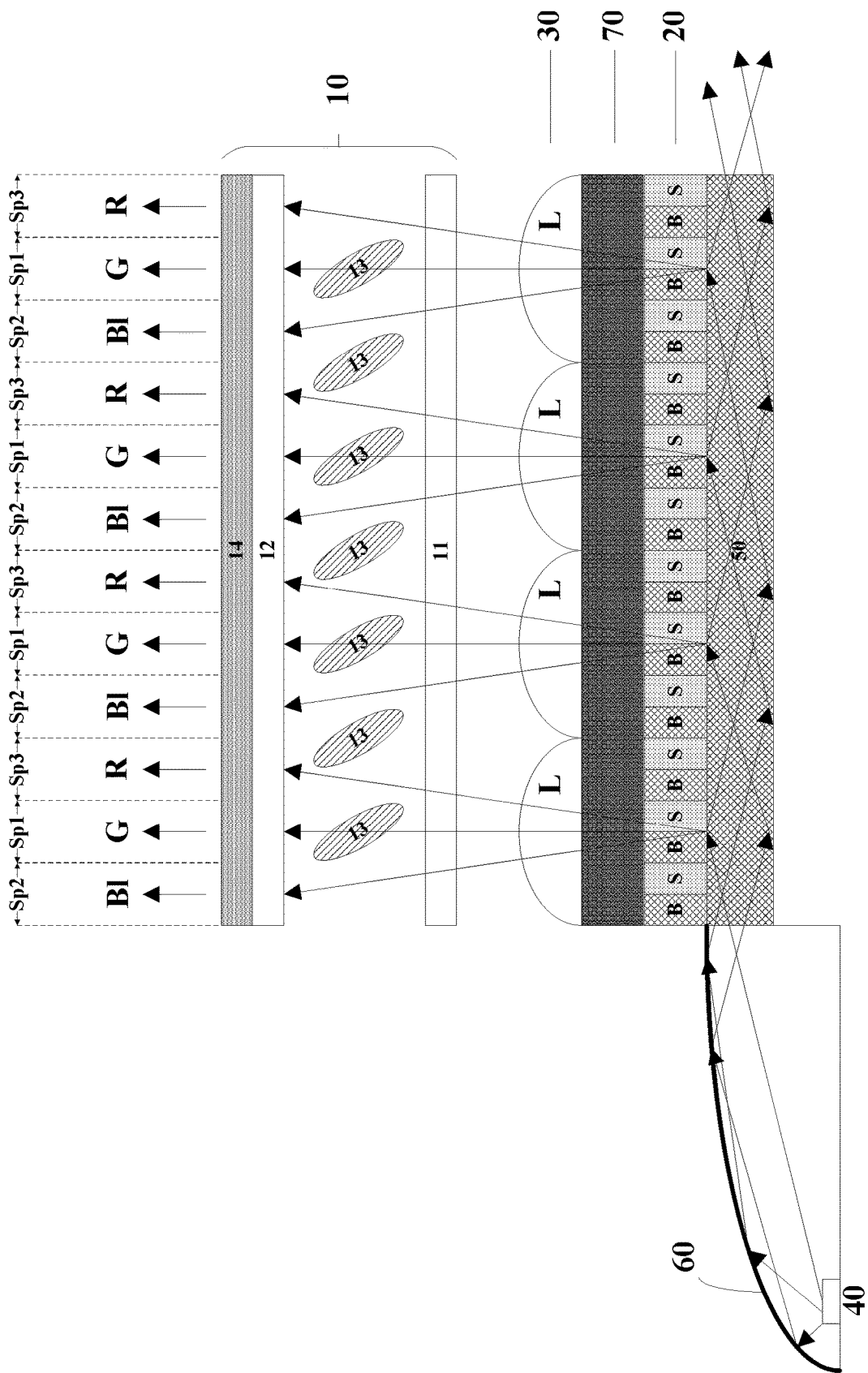
FIG. 3 is a schematic diagram illustrating the structure of a liquid crystal display apparatus in some embodiments according to the present disclosure.
Figure 4:
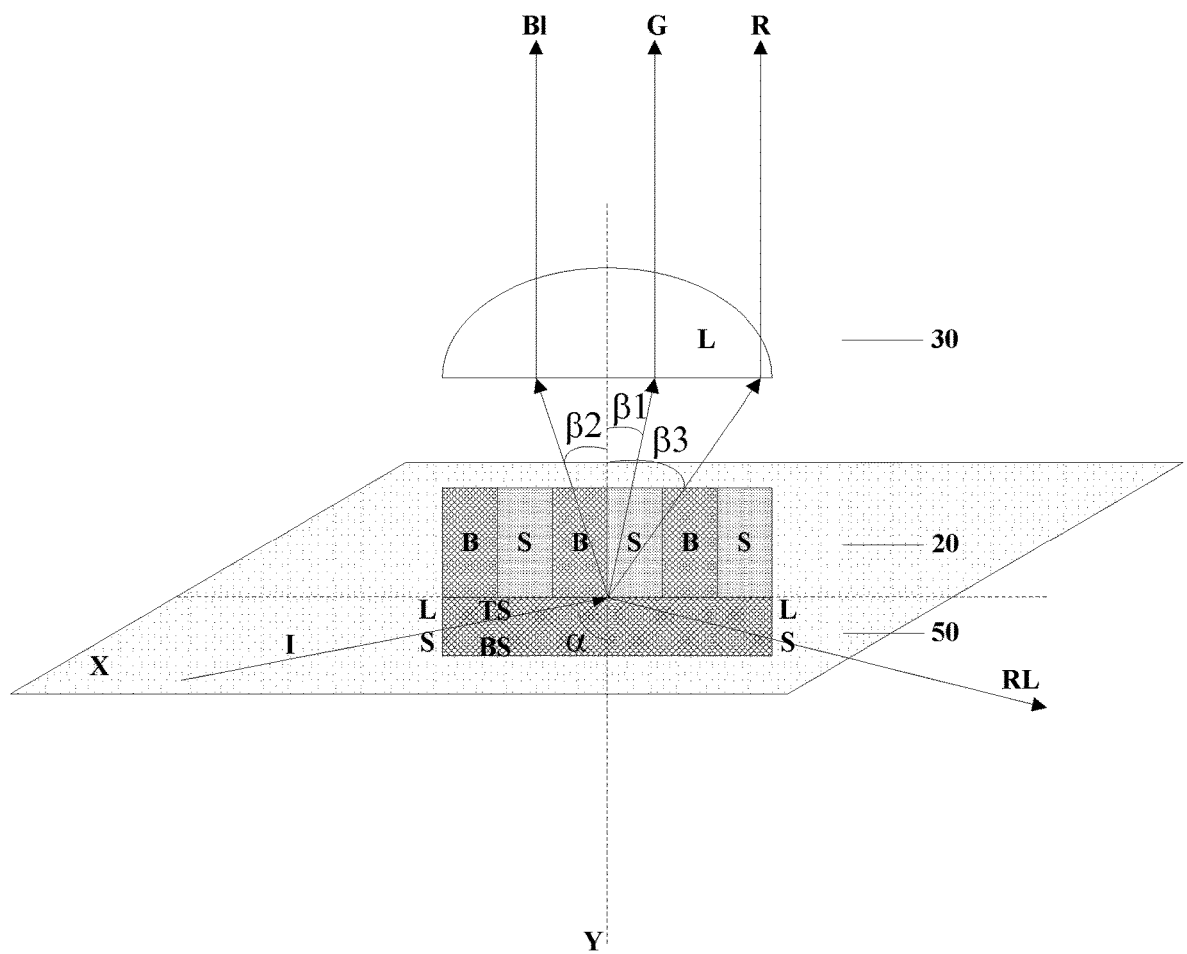
FIG. 4 is a schematic diagram illustrating light path of an incident light passing through an anisotropic grating of a liquid crystal display apparatus in some embodiments according to the present disclosure.

FIG. 3 is a schematic diagram illustrating the structure of a liquid crystal display apparatus in some embodiments according to the present disclosure. Referring to FIG. 3, the liquid crystal display apparatus in some embodiments further includes a light guide plate 50 on a side of the anisotropic grating 20 distal to the first base substrate 11 and configured to transmit light into the anisotropic grating 20. A least a part of the light incident from the lateral side(s) of the light guide plate 50 is totally reflected inside the light guide plate 50. FIG. 4 is a schematic diagram illustrating light path of an incident light passing through an anisotropic grating of a liquid crystal display apparatus in some embodiments according to the present disclosure. Referring to FIG. 3 and FIG. 4, an incident light I is transmitted onto the light guide plate 50. Tire incident light I is obliquely incident on a top side TS of the light guide plate 50 at an angle of incidence $\alpha$, and transmits inside the light guide plate 50. A first part of the incident light I is totally reflected by the top side TS of the light guide plate 50 as a reflected light RL. A second past of the incident light I transmits through the anisotropic grating 20, and is separated by the anisotropic grating 20 into at least three light of different colors, e.g., light of a first color, light of a second color, and light of a third color. In one example, the plane X is the same as the top side TS of the light guide plate 50. In another example, the plane X is the interface of the anisotropic grating 20 and a light guide plate 50. Optionally, $n_1$ is a refractive index of the light guide plate 50.

Referring to FIG. 2 and FIG. 4, in one example, the pitch p of the anisotropic grating 20 is approximately 399 run, a duty ratio of the anisotropic grating 20 is approximately 50%, and a thickness of the anisotropic grating 20 is approximately 100 nm. An average wavelength of the green light G is approximately 550 am, an average wavelength of the blue light Bl is approximately 450 nm, average wavelength of the red light R is approximately 650 nm. The light guide plate 50 has a refractive index of approximately 1.522. e.g., $n_1$ is 1,522, the intermediate layer 70 (between the anisotropic grating 20 and the lens array 30) has a refractive index of approximately 1.0, e.g., $n_2$ is 1.0, the angle of incidence $\alpha$ is approximately 65 degrees, the angle of diffraction $\beta1$ for the green light G is substantially zero, the angle of diffraction $\beta2$ for the blue light Bl is approximately −14.5 degrees, and the angle of diffraction $\beta3$ for the red light R is approximately 14.5 degrees.

Various appropriate optical materials and various appropriate fabricating methods may be used for making the light guide plate 50. Examples of appropriate optical materials for making the light guide plate 50 include indium tin oxide and silicon nitride (e.g., $Si_3N_4$). Indium tin oxide has a refractive index of approximately 1.858. $Si_3N_4$ has a refractive index of approximately 2.023. In one example, the light guide plate has a thickness of approximately 0.5 mm.

Various appropriate optical materials and various appropriate fabricating methods may be used for making the plurality of barriers B of the anisotropic grating 20. The plurality of barriers B are made of a non-anisotropic optical material. Examples of appropriate optical materials for making the light guide plate 50 include indium tin oxide and silicon nitride (e.g., $Si_3N_4$). Optionally, a refractive index of the light guide plate 50 is substantially same as a refractive index of the plurality of barriers B.

Referring to FIG. 1 and FIG. 3, in some embodiments, the liquid crystal display apparatus further includes a lens array 30 between the anisotropic grating 20 and the first base substrate 11. The lens array 30 includes a plurality of lenses L configured to focus the light of the first color into a subpixel of tire first color Sp1, the light of the second color into a subpixel of fire second color Sp2, and the light of the third color into a subpixel of the third color Sp3. Optionally, the plurality of lenses L are a plurality of cylindrical lenses. Optionally, the plurality of lenses L are a plurality of liquid crystal lenses.

Various appropriate optical materials and various appropriate fabricating methods may be used for making the plurality of lenses L. Examples of appropriate optical materials for making the plurality offenses L include glass, quartz, and liquid crystal molecules. Quartz has a refractive index of approximately 1.4585. Glass has a refractive index of approximately 1.52.

Figure 5:
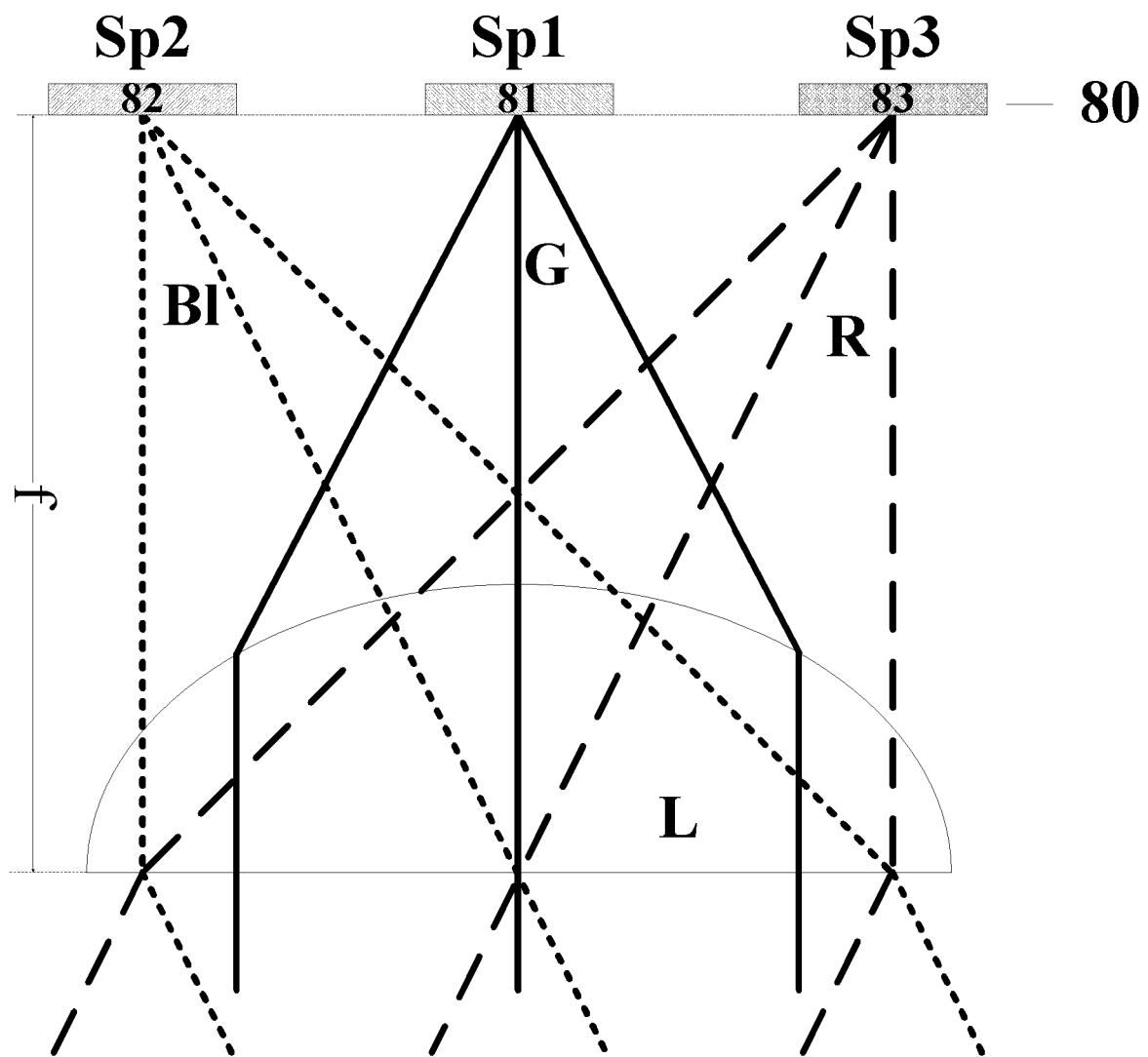
FIG. 5 is a schematic diagram illustrating light path of light passing through a lens array of a liquid crystal display apparatus in some embodiments according to the present disclosure.

FIG. 5 is a schematic diagram illustrating light path of light passing through a lens array of a liquid crystal display apparatus in some embodiments according to the present disclosure. Referring to FIG. 5, in some embodiments, each of the plurality of lenses L corresponds to three adjacent subpixels including the subpixel of the first color Sp1, the subpixel of the second color Sp2, and the subpixel of the third color Sp3. Optionally, an orthographic projection of each of the plurality of lenses L on the first base substrate 11 substantially covers orthographic projections of three adjacent subpixels including the subpixel of the first color Sp1, the subpixel of the second color Sp2, and the subpixel of the third color Sp3 on the first base substrate 11. Optionally, an orthographic projection of each of the plurality of lenses L on the first base substrate 11 substantially overlaps with orthographic projections of three adjacent subpixels including tire subpixel of the fir st color Sp1, the subpixel of the second color Sp2, and the subpixel of tire third color Sp3 on the first base substrate 11. Optionally, each of the plurality of lenses L is configured to focus the light of the first color (e.g., a green light G; solid lines) into the subpixel of the first color Sp1 of the three adjacent subpixels, the light of the second color (e.g., a blue light Bl; short-dashed lines) into the subpixel of the second color Sp2 of the three adjacent subpixels, and the light of the third color (e.g., a red light R; long-dashed lines) into the subpixel of the third color Sp3 of tire three adjacent subpixels. The dimensions of the plurality of lenses L can be designed such that the focal length f is adjusted such that the focal plane of the plurality of lenses L is at a desired location. Optionally, each of the plurality offenses L is configured to focus fight at a middle portion of the subpixels. Optionally, each of the plurality of lenses L is configured to focus light at a top portion of the subpixels. Optionally, each of the plurality offenses L is configured to focus fight at a bottom portion of tire subpixels.

In some embodiments, and referring to FIG. 5, the liquid crystal display apparatus birther includes a color filter 80. Optionally, the color filter 80 includes a plurality of first color filter blocks 81 each in a subpixel of the first color Sp1, a plurality of second color filter blocks 82 each in a subpixel of the second color Sp2, and a plurality of third color filter blocks 83 each in a subpixel of the third color Sp3. Optionally, and as shown in FIG. 5, the plurality of lenses L are configured to focus the light of the first color (e.g., a green light G) in to a plane containing the color filter 80 in a region corresponding to the plurality of first color filter blocks 81, the light of the second color (e.g., a blue light Bl) into the plane containing the color filter 80 in a region corresponding to the plurality of second color filter Mocks 82, and the light of the third color (e.g., a red light R) into the plane containing the color filter 80 in a region corresponding to the plurality of third color filter blocks 83.

In some embodiments, the liquid crystal display apparatus is absent of any color filter. Because the anisotropic grating 20 separates the incident light into light of three different colors, and the plurality of lenses L focus the light of the first color into a subpixel of the first color Sp1, the light of the second color into a subpixel of the second color Sp2, and the fight of the third color into a subpixel of the third color Sp3, a color filter is not required for color display.

Retelling to FIG. 3, the liquid crystal display apparatus in some embodiments further includes an intermediate layer 70 between the anisotropic grating 20 and the lens array 30. Optionally, the intermediate layer 70 is in direct contact with the anisotropic grating 20 on a first side, and is in direct contact with the lens array 30 (the plurality of lenses L) on a second side opposite to the first, side. As discussed above, m is a refractive index of a media in which the incident light I is transmitted, $n_2$ is a refractive index of a media in which the light separated by the anisotropic grating 20 is transmitted. When the liquid crystal display apparatus includes the light guide plate 50 and the intermediate layer 70, $n_1$ is the refractive index of the light guide plate 50, and $n_2$ is the refractive index of the intermediate layer 70. Optionally, $n_2$ is less than $n_1$, e.g., the intermediate layer 70 has a refractive index less than a refractive index of the light guide plate 50. When the liquid crystal display apparatus does not include an intermediate layer 70, $n_1$ is the refractive index of the light guide plate 50, and $n_2$ is the refractive index of the plurality of lenses L. Optionally, $n_2$ is less than $n_1$, e.g., the plurality of lenses L have a refractive index less than a refractive index of the light guide plate 50. By having these conditions, the incident light I can be substantially totally reflected inside the light guide plate 50 except tor the light, transmitted through and separated by the anisotropic grating 20. By having an intermediate layer 70, the anisotropic grating 20 can be protected. Optionally, the intermediate layer 70 has a refractive index substantially the same as a refractive, index of the plurality offenses L.

Various appropriate optical materials and various appropriate fabricating methods may be used for making the intermediate layer 70. Examples of appropriate optical materials for making the intermediate layer 70 include glass and quartz. Quartz has a refractive index of approximately 1.4585. Glass has a refractive index of approximately 1.52.

In some embodiments, and referring to FIG. 1 and FIG. 3, the anisotropic grating 20 includes an anisotropic optical material in the plurality of slits S. For example, the anisotropic grating 20 is filled with the anisotropic optical material in the plurality of slits S. Optionally, the anisotropic optical material has a first refractive index for a transverse magnetic (TM) component of the incident light and a second refractive index for a transverse electric (TE) component of the incident light. Optionally, the first refractive index is different from the second refractive index. Optionally, the anisotropic grating 20 is configured to selectively diffract the transverse magnetic (TM) component of the incident light into the liquid crystal display module 10 and configured to selectively block the transverse electric (TE) component of the incident light from entering into the liquid crystal display module 10.

In some embodiments, the plurality of barriers B are made of a non-anisotropic optical material, and have a refractive index substantially the same as an ordinary ray refractive index $n_o$ of the anisotropic optical material. Optionally, the light guide plate 50 and the plurality of barriers B have a substantially the same refractive index, e.g., the plurality of barriers B have a refractive index substantially the same as an ordinary ray refractive index $n_o$ of the anisotropic optical material, and substantially the same as the refractive index of the light guide plate 50. Optionally, the refractive index of the light guide plate 50 is substantially same as an ordinary ray refractive index of the anisotropic optical material. Optionally, the first refractive index is greater hum the ordinary ray refractive index $n_o$ of the anisotropic optical material and equal to or less than an extraordinary ray refractive index rig of the anisotropic optical material. Optionally, the second refractive index is substantially same as the ordinary ray refractive index $n_o$ of the anisotropic optical material.

Became the plurality of barriers B have a refractive index substantially the same as an ordinary ray refractive index $n_o$ of the anisotropic optical material, with respect to the transverse electric (TE) component of the incident light the anisotropic optical material exhibits a refractive index (i.e., the second refractive index) substantially the same as the refractive indexes of the light guide plate 50 and the plurality of hairier B. Thus, the light grade plate 50, the plurality of barrier B, and the anisotropic optical material in the plurality of slits S functions as equivalents of a single light guide plate. The transverse electric (TE) component of the incident light is not diffracted by the anisotropic grating 20, and is continuously totally reflected inside the light guide plate 50. Accordingly, the anisotropicgrating 20 selectively Mocks the transverse electric (TE) component of the incident light from entering into the liquid crystal display module 10.

With respect to the transverse magnetic (TM) component of the incident light, the anisotropic optical material exhibits a refractive index (i.e., the first refractive index) greater than the ordinary ray refractive index $n_o$ of the anisotropic optical material and equal to or less than an extraordinary ray refractive index $n_e$ of the anisotropic optical material. Accordingly, the first refractive index is different from the refractive index of the plurality of barriers B and different from the refractive index of the light guide plate 50. Thus, the transverse magnetic (TM) component of the incident light is diffracted by the anisotropic grating 20. Accordingly, the anisotropic grating 20 selectively diffracts the transverse magnetic (TM) component of the incident light into the liquid crystal display module 10. As discussed above, the diffract light is separated into light of a first color, light of a second color, and light of a third color, which are emitted at different exit angles.

Because the anisotropic grating 20 selectively blocks the transverse electric (TE) component of the incident light from entering into the liquid crystal display module 10, and selectively diffracts the transverse magnetic (TM) component of the incident light into the liquid crystal display module 10, the liquid crystal display apparatus in some embodiments does not require a lower polarizer, but only require an upper polarizer. In some embodiments, and referring to FIG. 1 and FIG. 3, the liquid crystal display apparatus further includes a polarizer 14 on a side of the liquid crystal layer 13 distal to the first base substrate 11, and is abs ent of any polarizer on a s ide of the liquid crystal layer 13 distal to the second base substrate 12.

Various appropriate anisotropic optical materials and various appropriate fabricating methods may be used for fill the plurality of slits S. Examples of appropriate anisotropic optical materials include various liquid crystal materials.

Figure 6A:
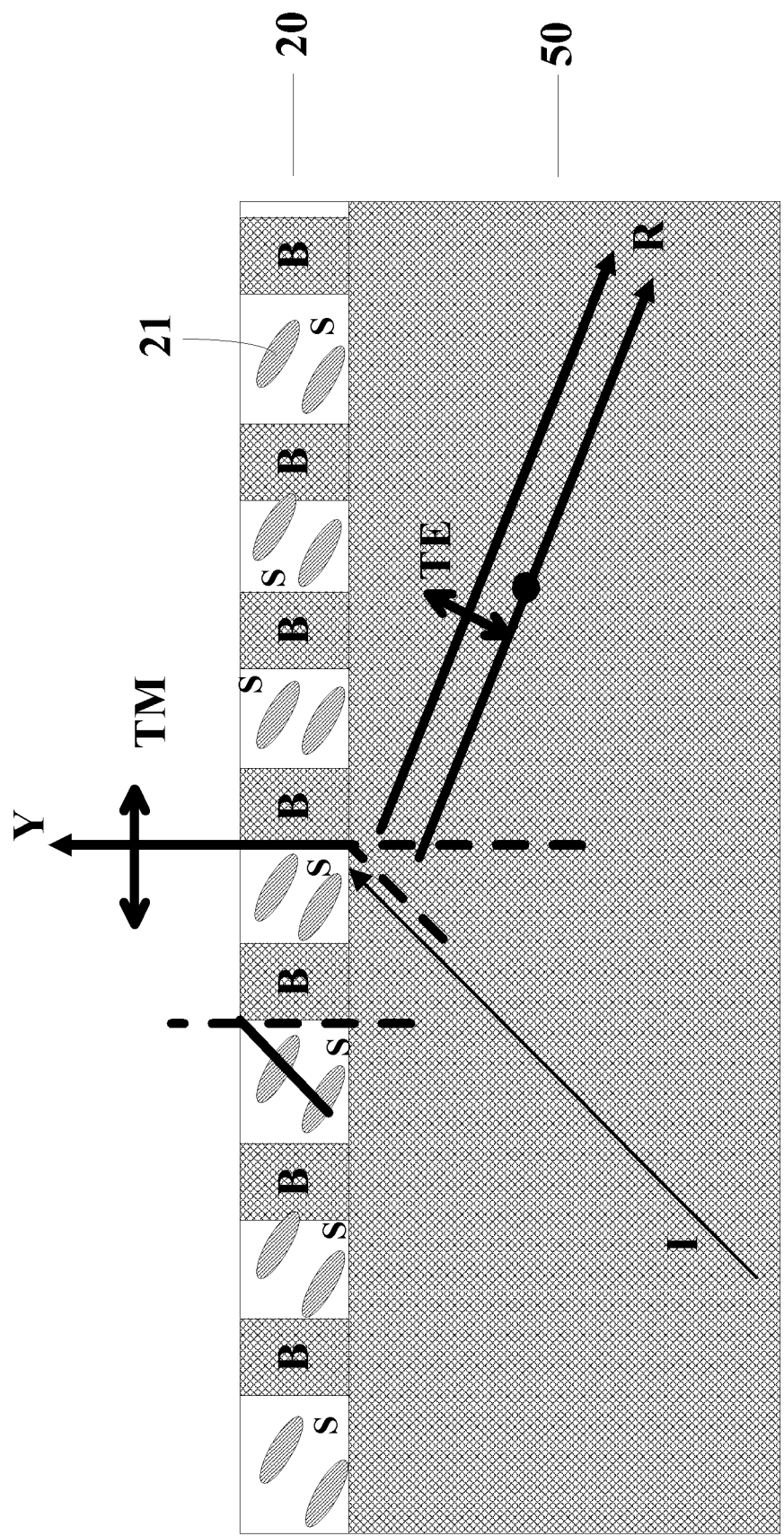
FIG. 6A is a schematic diagram illustrating light path of a transverse magnetic (TM) component and a transverse electric (TE) component of an incident light at an interface between a fight guide plate and an anisotropic grating in a liquid crystal display apparatus in some embodiments according to the present disclosure.
Figure 6B:
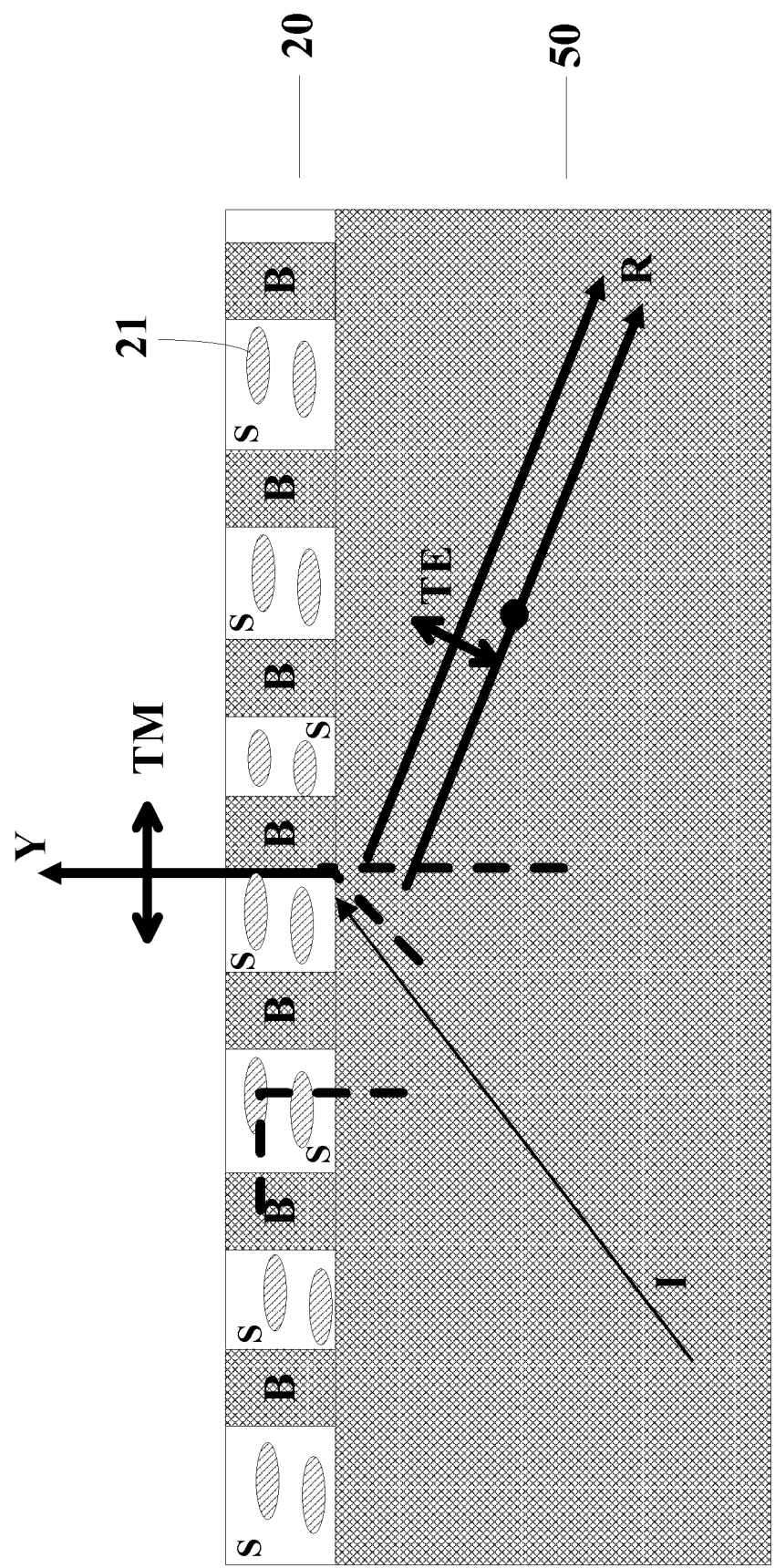
FIG. 6B is a schematic diagram illustrating light path of a transverse magnetic (TM) component and a transverse electric (TE) component of an incident light at an interface between a light guide plate and an anisotropic grating in a liquid crystal display apparatus in some embodiments according to the present disclosure.

The liquid crystal molecules in the anisotropic optical material hi the plurality of slits S of the anisotropic grating 20 may be aligned along various appropriate orientations. FIGS. 6A and 6B are schematic diagrams illustrating light path, of a transverse magnetic (TM) component and a transverse electric (TE) component of an incident light at an interface between a light guide plate and an anisotropic grating in a liquid crystal display apparatus in some embodiments according to the present disclosure. By aligning the liquid crystal molecules 21 along different orientations, the first refractive index with respect to the transverse magnetic (TM) component of the incident light may be adjusted. Referring to FIG. 6A, the liquid crystal molecules 21 are aligned along a fir st orientation such that the first refractive index with respect to the transverse magnetic (TM) component of the incident light is substantially equal to the extraordinary ray refractive index $n_e$ of the anisotropic optical material. Referring to FIG. 6B, the liquid crystal molecules 21 are aligned along a second orientation such that the first refractive index with respect to the transverse magnetic (TM) component of the incident light is less than the extraordinary ray refractive index $n_e$ of the anisotropic optical material and greater than the ordinary ray refractive index $n_o$ of the anisotropic optical material.

Referring to FIG. 3, in some embodiments, the liquid crystal display apparatus further includes one or more light sources 40 and a reflective mirror 60. Various appropriate light sources may be used in the liquid crystal display apparatus. Examples of appropriate light sources include micro-light emitting diode (micro-LED) chips, quantum-dots light emitting diode (QD LED) light source, and an organic light emitting diode (DEED) light source. Optionally, the one or more light sources 40 emit a white light Optionally, the one or more light sources 40 emit a light having a relatively narrow spectrum. Optionally, the one or more light sources 40 includes one or more red light sources, one or more green light sources, and one or more blue light sources, and the one or more light sources 40 emit a compound light of red light, green light and blue light.

The reflective mirror 60 is configured to collimate light from the one or more light sources 40 into substantially collimated light. Referring to FIG. 3 and FIG. 4, in some embodiments, the light guide plate 50 is configured to receive the substantially collimated light from one or more lateral sides LS of the light guide plate 50, and configured to transmit light into the anisotropic grating 20 through a top side TS of the light guide plate 50. The reflective mirror 60 can have various appropriate shapes. Optionally, the reflective mirror 60 is a curved mirror. Optionally, the substantially collimated light entering into the one or more lateral sides LS of the light guide plate 50 has an average angle of incidence equal to or greater than 80 degrees.

Figure 7:
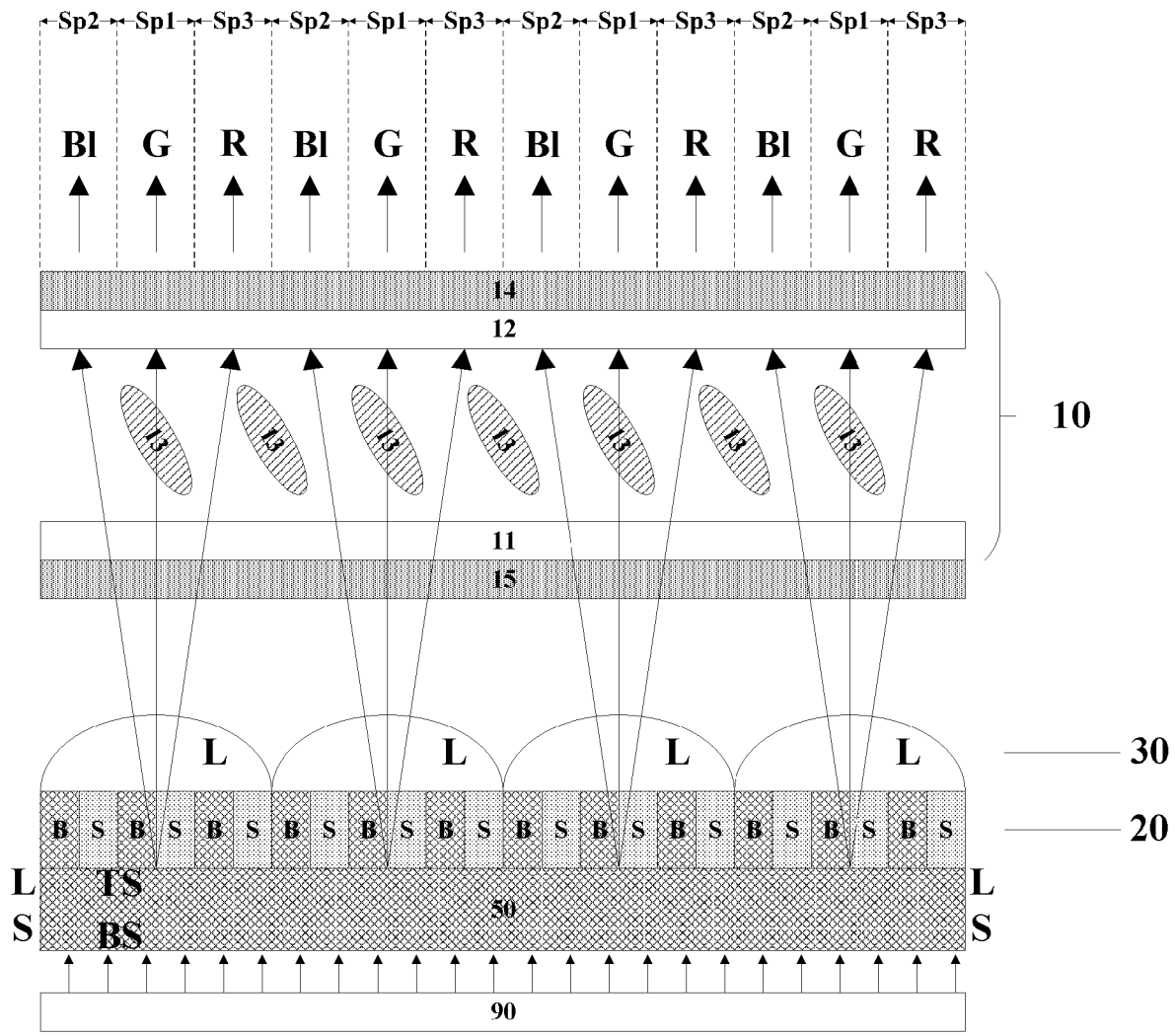
FIG. 7 is a schematic diagram illustrating the structure of a liquid crystal display apparatus in some embodiments according to the present disclosure.

FIG. 7 is a schematic diagram illustrating the structure of a liquid crystal display apparatus in some embodiments according to the present disclosure. Referring to FIG. 7, the liquid crystal display apparatus in some embodiments has a direct-lit backlight 90 on side of the light guide plate 50 distal to the anisotropic grating 20. The light guide plate 50 is configured to receive light from the direct-lit backlight 90 from a bottom side BS of the light guide plate 50, and configured to transmit light into the anisotropic grating 20 through a top side TS of the light guide plate 50. Optionally, tire top side TS is substantially opposite to the bottom side BS. Optionally, when the liquid crystal display apparatus includes tire direct-lit backlight 90 as the light source, the liquid crystal display apparatus further includes a lower polarizer 15 on a side of the liquid crystal layer 13 distal to the first base substrate 11.

In some embodiments, the liquid crystal display module 10 is a Twisted Nematic (TN) liquid crystal display module, hi some embodiments, tire liquid crystal display module 10 is an Electrical Controlled Birefringence (ECB) liquid crystal display module, hi some embodiments, the liquid crystal display module 10 is a fringe field driven liquid crystal display module, in winch the liquid crystal layer is driven by a fringe electric field. Examples of fringe field driven liquid crystal display module include, but are not limited to, an advanced super-dimensional switching (ADS) liquid crystal display module, an in-plane switch (IPS) liquid crystal display module, and a hinge field switching (FFS) liquid crystal display module.

In another aspect, the present disclosure provides a back light for a liquid crystal display panel. In some embodiments, the back light includes one or more light sources, and an anisotropic grating including a plurality of barriers and a plurality of slits arranged alternately. Optionally, the anisotropic grating is configured to separate incident light into light of a first color, light of a second color, and light of a third color, and configured to emit the light of the first color, the light of the second color, and the light of the third color at different exit angles, respectively. Optionally, the anisotropic grating includes an anisotropic optical material in the plurality of slits, the anisotropic optical material has a first refractive index for a transverse magnetic component of the incident light and a second refractive index for a transverse electric component of the incident light, the first refractive index being different from the second refractive index. Optionally, the anisotropic grating is configured to selectively diffract the transverse magnetic component of the incident light and selectively block the transverse electric component of the incident light.

In some embodiments, the plurality of barriers are made of a non-anisotropic optical material, and have a refractive index substantially same as an ordinary ray refractive index of the anisotropic optical material. Optionally, the first refractive index is greater than the ordinary ray refractive index of the anisotropic optical material and equal to or less than an extraordinary ray refractive index of the anisotropic optical material. Optionally, the second refractive index is substantially same as the ordinary ray refractive index of the anisotropic optical material.

In some embodiments, the back light further includes a light guide plate configured to transmit light into the anisotropic grating. Optionally, a refractive index of the light guide plate is substantially same as a refractive index of the plurality of barriers. Optionally, the refractive index of the light guide plate is substantially same as an ordinary ray refractive index of the anisotropic optical material.

In some embodiments, the plurality of barriers are made of a non-anisotropic optical material, and have a refractive index substantially same as the ordinary ray refractive index of the anisotropic optical material and substantially same as the refractive index of the light guide plate. Optionally-, the first refractive index is greater than the ordinary ray refractive index of the anisotropic optical material and equal to or less than an extraordinary ray refractive index of the anisotropic optical material. Optionally, the second refractive index is substantially same as the ordinary ray refractive index of tire anisotropic optical material.

In some embodiments, the back light further includes a reflective mirror. Optionally, the reflective mirror is configured to collimate light from the one or more light sources into substantially collimated light. Optionally, the light guide plate is configured to receive the substantially collimated light from one or more lateral sides of the light guide plate, and configured to transmit light into the anisotropic grating through a top side of the light guide plate.

In some embodiments, the one or more light sources are on a side of the light guide plate distal to the anisotropic grating. Optionally, the light guide plate is configured to receive light from the one or more light sources from a bottom side of the light guide plate, and configured to transmit light into the anisotropic grating through a top side of the light guide plate, the top side being substantially opposite to the bottom side.

In some embodiments, the back light farther includes a lens array on a side of the anisotropic grating distal to the one or more light sources. Optionally, the lens array includes, a plurality of lenses configured to focus the light of the first color into a first position, the light of the second color into a second position, and the light of the third color into a third position. Optionally, each of the plurality of lenses corresponds to three adjacent positions including the first position, the second position, and the third position. Optionally, each of the plurality of lenses is configured to focus the light of the first color into the first position of the three adjacent positions, the light of the second color into the second position of the three adjacent positions, and the light of the third color into the third position of the three adjacent positions.

In some embodiments, the back light further includes an intermediate layer between the anisotropic grating and the lens may. Optionally, the back light farther includes a light guide plate on a side of the anisotropic grating distal to the intermediate layer and configured to transmit light into the anisotropic grating. Optionally, the intermediate layer has a refractive index less than a refractive index of the light guide plate.

Optionally, the anisotropic optical material includes a liquid crystal molecule. Optionally, the light of the first color, the light of the second color, and the light of the third color are a green fight, a blue light, and a red light, respectively.

In another aspect, the present disclosure provides a method of fabricating a liquid crystal display apparatus, hi some embodiments, the method includes forming a liquid crystal layer on a base substrate; and forming an anisotropic grating on a side of the liquid crystal layer distal to the base substrate and formed to include a plurality of barriers and a plurality of slits arranged alternately, the anisotropic grating is configured to separate incident light into light of a fir st color, light of a second color, and light of a third color, and configured to emit the light of the first color, the light of the second color, and tire light of the third color at different exit angles, respectively. Optionally, the anisotropic grating is formed to include an anisotropic optical material in the plurality of slits, the anisotropic optical material has a first refractive index for a transverse magnetic component of the incident light and a second refractive index for a transverse electric component of the incident light, the first refractive index being different from the second refractive index.

In some embodiments, the plurality of barriers are made of a non-anisotropic optical material having a refractive index substantially same as an ordinary ray refractive index of the anisotropic optical material. Optionally, the first refractive index is greater than the ordinary ray refractive index of the anisotropic optical material and equal to or less than an extraordinary ray refractive index of the anisotropic optical material. Optionally, the second refractive index is substantially same as the ordinary ray refractive index of the anisotropic optical material.

In some embodiments, the method further includes forming a polarizer on a side of the liquid crystal layer distal to the anisotropic grating. Optionally, the liquid crystal display apparatus is formed absent of any polarizer on a side of the liquid crystal layer distal to the base substrate.

In some embodiments, the method further includes forming a light guide plate on a side of the anisotropic grating distal to the liquid crystal layer and configured to transmit light into the anisotropic grating. Optionally, the light guide plate is made of a material having a refractive index that is substantially same as a refractive index of the plurality of barriers. Optionally, the light guide plate is made of a material having a refractive index that is substantially same as an ordinary ray refractive index of the anisotropic optical material. Optionally, the plurality of barriers are made of a non-anisotropic optical material having a refractive index substantially same as the ordinary ray refractive index of the anisotropic optical material and substantially same as the refractive index of the light guide plate. Optionally, the first refractive index is greater than the ordinary ray refractive index of the anisotropic optical material and equal to or less than an extraordinary ray refractive index of the anisotropic optical material. Optionally, the second refractive index is substantially same as the ordinary ray refractive index of the anisotropic optical material.

In some embodiments, the method further includes providing one or more light sources, and providing a reflective mirror configured to collimate light from the one or more light sources into substantially collimated light. Optionally, the light guide plate is formed to receive the substantially collimated light from one or more lateral sides of the light guide plate, and configured to transmit light into the anisotropic grating through a top side of the light guide plate.

In some embodiments, the method further includes providing one or more light sources on a side of the light guide plate distal to the anisotropic grating. Optionally, the light guide plate is formed to receive light from the one or more light sources from a bottom side of the light guide plate, and configured to transmit light into the anisotropic grating through a top side of the light guide plate, the top side being substantially opposite to the bottom side.

In some embodiments, the method further includes forming a lens array between the anisotropic grating and the liquid crystal layer. Optionally, the step of forming the lens array includes forming a plurality of leases configured to focus the light of the first color into a subpixel of the first color, the light of the second color into a subpixel of the second color, and the light of the third color into a subpixel of the third color. Optionally, each of the plurality of lenses is formed to correspond to three adjacent subpixels including the subpixel of the first color, the subpixel of the second color, and the subpixel of the third color. Optionally, each of the plurality of lenses is formed to focus the light of the first color into the subpixel of the first color of the three adjacent subpixels, the light of the second color into the subpixel of the second color of the three adjacent subpixels, and the light of the third color into the subpixel of the third color of the three adjacent subpixels.

In some embodiments, the method further includes forming an intermediate layer between the anisotropic grating and the lens array. Optionally, the method further includes forming a light guide plate on a side of the anisotropic grating distal to the liquid crystal layer and configured to transmit light into the anisotropic grating. Optionally, the intermediate layer is made of a material having a refractive index less than a refractive index of the light guide plate.

In some embodiments, the method further includes forming a color filter. Optionally, the step of forming the color filter includes forming a plurality of first color filter blocks, a plurality of second color filter blocks, and a plurality of third color filter blocks. Optionally, the method further includes forming a lens army between the anisotropic grating and the liquid crystal layer. Optionally, the step of forming the lens array includes forming a plurality of lenses. Optionally, the plurality of lenses are formed to focus the light of the first color into a plane containing the color filter in a region corresponding to the plurality of first color filter blocks, the light of the second color into the plane containing the color filter in a region corresponding to the plurality of second color filter blocks, and the light of the third color into the plane containing the color filter in a region corresponding to the plurality of third color filter blocks.

Optionally, the anisotropic grating is formed as an integral part of the liquid crystal display apparatus. For example, the anisotropic grating is formed as an integral part of an array substrate of the liquid crystal display apparatus.

Optionally, the anisotropic grating is separately formed from the array substrate. Optionally, the anisotropic grating is formed separately, and attached to the array substrate.

Optionally, the anisotropic grating is formed as part of a back light.

In another aspect, the present disclosure provides a method of fabricating a back light for a liquid crystal display panel. In some embodiments, the method includes forming an anisotropic grating. Optionally, the step of forming the anisotropic grating includes forming a plurality of barriers and a plurality of slits arranged alternately. Optionally, the anisotropic grating is formed to separate incident light into light of a first color, light of a second color, and light of a third color, and formed to emit the light of the first color, the light of the second color, and the light of the third color at different exit angles, respectively. Optionally, the anisotropic grating is formed to include an anisotropic optical material in the plurality of slits, the anisotropic optical material has a first refractive index for a transverse magnetic component of the incident light and a second refractive index for a transverse electric component of the incident light, the first refractive index being different from the second refractive index. Optionally, the anisotropic grating is formed to selectively diffract the transverse magnetic component of the incident light and selectively block the transverse electric component of the incident light.

Optionally, the method further includes forming or providing one or more light sources.

In some embodiments, the plurality of barriers are made of a non-anisotropic optical material, and have a refractive index substantially same as an ordinary ray refractive index of the anisotropic optical material. Optionally, the first refractive index is greater than the ordinary ray refractive index of the anisotropic optical material and equal to or less than an extraordinary ray refractive index of the anisotropic optical material. Optionally, the second refractive index is substantially same as the ordinary ray refractive index of the anisotropic optical material.

In some embodiments, the method further includes forming or providing a light guide plate between the one or more light sources and the anisotropic grating. The light guide plate is formed to transmit light into the anisotropic grating. Optionally, a refractive index of the light guide plate is substantially same as a refractive index of the plurality of barriers. Optionally, the refractive index of the light guide plate is substantially same as an ordinary ray refractive index of the anisotropic optical material.

Optionally, the plurality of barriers are made of a non-anisotropic optical material, and have a refractive index substantially same as the ordinary ray refractive index of the anisotropic optical material and substantially same as the refractive index of the light guide plate; the first refractive index is greater than the ordinary ray refractive index of the anisotropic optical material and equal to or less than an extraordinary ray refractive index of the anisotropic optical material; and the second refractive index is substantially same as the ordinary ray refractive index of the anisotropic optical material.

In some embodiments, the method further includes forming or providing a reflective mirror. The reflective mirror is configured to collimate light from the one or more light sources into substantially collimated light. Optionally, the light guide plate is formed to receive the substantially collimated light from one or more lateral sides of the light guide plate, and configured to transmit light into the anisotropic grating through a top side of the light guide plate.

In some embodiments, the light guide plate is formed to receive light from the one or more light sources from a bottom side of the light guide plate, and configured to transmit light into the anisotropic grating through a top side of the light guide plate, the topside being substantially opposite to the bottom side.

In some embodiments, the method further includes forming or providing a lens array on a side of the anisotropic grating distal to the one or more light sources. Optionally, the lens array is formed to include a plurality of lenses configured to focus the light of the first color into a first position, the light of the second color into a second position, and the light of the third color into a third position. Optionally, each of the plurality of lenses corresponds to three adjacent positions including the first position, the second position, and the third position. Optionally, each of the plurality of lenses is formed to focus the light of the first color into the first position of the three adjacent positions, the light of the second color into the second position of the three adjacent positions, and the light of the third color into the third position of the three adjacent positions.

In some embodiments, the method further includes forming an intermediate layer prior to forming the lens array, the intermediate layer is formed between the anisotropic grating and the lens array. Optionally, the intermediate layer has a refractive index less than a refractive index of the light guide plate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display apparatus, comprising:
a base substrate;
a liquid crystal layer; and
an anisotropic grating on a side of the liquid crystal layer distal to the base substrate and comprising a plurality of barriers and a plurality of slits arranged alternately, the anisotropic grating is configured to separate incident light into light of a first color, light of a second color, and light of a third color, and configured to emit the light of the first color, the light of the second color, and the light of the third color at different exit angles, respectively;
wherein the anisotropic grating comprises an anisotropic optical material in the plurality of slits, the anisotropic optical material has a first refractive index for a transverse magnetic component of the incident light and a second refractive index for a transverse electric component of the incident light, the first refractive index being different from the second refractive index.

2. The liquid crystal display apparatus of claim 1, wherein the anisotropic grating is configured to selectively diffract the transverse magnetic component of the incident light into the liquid crystal layer and selectively block the transverse electric component of the incident light from entering into the liquid crystal layer.

3. The liquid crystal display apparatus of claim 1, wherein the plurality of barriers are made of a non-anisotropic optical material, and have a refractive index substantially same as an ordinary ray refractive index of the anisotropic optical material;
the first refractive index is greater than the ordinary ray refractive index of the anisotropic optical material and equal to or less than an extraordinary ray refractive index of the anisotropic optical material; and
the second refractive index is substantially same as the ordinary ray refractive index of the anisotropic optical material.

4. The liquid crystal display apparatus of claim 1, further comprising a polarizer on a side of the liquid crystal layer distal to the anisotropic grating;
wherein the liquid crystal display apparatus is absent of any polarizer on a side of the liquid crystal layer distal to the base substrate.

5. The liquid crystal display apparatus of claim 1, further comprising a light guide plate on a side of the anisotropic grating distal to the liquid crystal layer and configured to transmit light into the anisotropic grating.

6. The liquid crystal display apparatus of claim 5, wherein a refractive index of the light guide plate is substantially same as a refractive index of the plurality of barriers.

7. The liquid crystal display apparatus of claim 6, wherein the refractive index of the light guide plate is substantially same as an ordinary ray refractive index of the anisotropic optical material.

8. The liquid crystal display apparatus of claim 7, wherein the plurality of barriers are made of a non-anisotropic optical material, and have a refractive index substantially same as the ordinary ray refractive index of the anisotropic optical material and substantially same as the refractive index of the light guide plate;
the first refractive index is greater than the ordinary ray refractive index of the anisotropic optical material and equal to or less than an extraordinary ray refractive index of the anisotropic optical material; and the second refractive index is substantially same as the ordinary ray refractive index of the anisotropic optical material.

9. The liquid crystal display apparatus of claim 5, further comprising:
one or more light sources; and
a reflective mirror configured to collimate light from the one or more light sources into substantially collimated light;
wherein the light guide plate is configured to receive the substantially collimated light from one or more lateral sides of the light guide plate, and configured to transmit light into the anisotropic grating through a top side of the light guide plate.

10. The liquid crystal display apparatus of claim 5, further comprising one or more light sources on a side of the light guide plate distal to the anisotropic grating;
wherein the light guide plate is configured to receive light from the one or more light sources from a bottom side of the light guide plate, and configured to transmit light into the anisotropic grating through a top side of the light guide plate, the top side being substantially opposite to the bottom side.

11. The liquid crystal display apparatus of claim 1, further comprising a lens array between the anisotropic grating and the liquid crystal layer and comprising a plurality of lenses configured to focus the light of the first color into a subpixel of the first color, the light of the second color into a subpixel of the second color, and the light of the third color into a subpixel of the third color.

12. The liquid crystal display apparatus of claim 11, wherein each of the plurality of lenses corresponds to three adjacent subpixels including the subpixel of the first color, the subpixel of the second color, and the subpixel of the third color; and
each of the plurality of lenses is configured to focus the light of the first color into the subpixel of the first color of the three adjacent subpixels, the light of the second color into the subpixel of the second color of the three adjacent subpixels, and the light of the third color into the subpixel of the third color of the three adjacent subpixels.

13. The liquid crystal display apparatus of claim 11, further comprising an intermediate layer between the anisotropic grating and the lens array.

14. The liquid crystal display apparatus of claim 13, further comprising a light guide plate on a side of the anisotropic grating distal to the liquid crystal layer and configured to transmit light into the anisotropic grating;
wherein the intermediate layer has a refractive index less than a refractive index of the light guide plate.

15. The liquid crystal display apparatus of claim 1, wherein the liquid crystal display apparatus is absent of any color filter.

16. The liquid crystal display apparatus of claim 1, further comprising a color filter, the color filter comprising a plurality of first color filter blocks, a plurality of second color filter blocks, and a plurality of third color filter blocks.

17. The liquid crystal display apparatus of claim 16, further comprising a lens array between the anisotropic grating and the liquid crystal layer and comprising a plurality of lenses;
wherein the plurality of lenses are configured to focus the light of the first color into a plane containing the color filter in a region corresponding to the plurality of first color filter blocks, the light of the second color into the plane containing the color filter in a region corresponding to the plurality of second color filter blocks, and the light of the third color into the plane containing the color filter in a region corresponding to the plurality of third color filter blocks.

18. The liquid crystal display apparatus of claim 1, wherein the anisotropic optical material comprises a liquid crystal molecule.

19. The liquid crystal display apparatus of claim 1, wherein the light of the first color, the light of the second color, and the light of the third color are a green light, a blue light, and a red light, respectively.

20. A back light for a liquid crystal display panel, comprising:
one or more light sources;
an anisotropic grating including a plurality of barriers and a plurality of slits arranged alternately;
wherein the anisotropic grating is configured to separate incident light into light of a first color, light of a second color, and light of a third color, and configured to emit the light of the first color, the light of the second color, and the light of the third color at different exit angles, respectively; and
the anisotropic grating comprises an anisotropic optical material in the plurality of slits, the anisotropic optical material has a first refractive index for a transverse magnetic component of the incident light and a second refractive index for a transverse electric component of the incident light, the first refractive index being different from the second refractive index.

21. The back light of claim 20, wherein the anisotropic grating is configured to selectively diffract the transverse magnetic component of the incident light and selectively block the transverse electric component of the incident light.

22. The back light of claim 20, wherein the plurality of barriers are made of a non-anisotropic optical material, and have a refractive index substantially same as an ordinary ray refractive index of the anisotropic optical material;
the first refractive index is greater than the ordinary ray refractive index of the anisotropic optical material and equal to or less than an extraordinary ray refractive index of the anisotropic optical material; and
the second refractive index is substantially same as the ordinary ray refractive index of the anisotropic optical material.

23. The back light of claim 20, further comprising a light guide plate configured to transmit light into the anisotropic grating.

24. The back light of claim 23, wherein a refractive index of the light guide plate is substantially same as a refractive index of the plurality of barriers.

25. The back light of claim 24, wherein the refractive index of the light guide plate is substantially same as an ordinary ray refractive index of the anisotropic optical material.

26. The back light of claim 25, wherein the plurality of barriers are made of a non-anisotropic optical material, and have a refractive index substantially same as the ordinary ray refractive index of the anisotropic optical material and substantially same as the refractive index of the light guide plate;
the first refractive index is greater than the ordinary ray refractive index of the anisotropic optical material and equal to or less than an extraordinary ray refractive index of the anisotropic optical material; and
the second refractive index is substantially same as the ordinary ray refractive index of the anisotropic optical material.

27. The back light of claim 23, further comprising a reflective mirror configured to collimate light from the one or more light sources into substantially collimated light;
 wherein the light guide plate is configured to receive the substantially collimated light from one or more lateral sides of the light guide plate, and configured to transmit light into the anisotropic grating through a top side of the light guide plate.

28. The back light of claim 23, wherein the one or more light sources are on a side of the light guide plate distal to the anisotropic grating; and
 the light guide plate is configured to receive light from the one or more light sources from a bottom side of the light guide plate, and configured to transmit light into the anisotropic grating through a top side of the light guide plate, the top side being substantially opposite to the bottom side.

29. The back light of claim 20, further comprising a lens array on a side of the anisotropic grating distal to the one or more light sources and comprising a plurality of lenses configured to focus the light of the first color into a first position, the light of the second color into a second position, and the light of the third color into a third position.

30. The back light of claim 29, wherein each of the plurality of lenses corresponds to three adjacent positions including the first position, the second position, and the third position; and
 each of the plurality of lenses is configured to focus the light of the first color into the first position of the three adjacent positions, the light of the second color into the second position of the three adjacent positions, and the light of the third color into the third position of the three adjacent positions.

31. The back light of claim 29, further comprising an intermediate layer between the anisotropic grating and the lens array.

32. The back light of claim 31, further comprising a light guide plate on a side of the anisotropic grating distal to the intermediate layer and configured to transmit light into the anisotropic grating;
 wherein the intermediate layer has a refractive index less than a refractive index of the light guide plate.

33. The back light of claim 20, wherein the anisotropic optical material comprises a liquid crystal molecule.

34. The back light of claim 20, wherein the light of the first color, the light of the second color, and the light of the third color are a green light, a blue light, and a red light, respectively.

35. A method of fabricating a liquid crystal display apparatus, comprising:
 forming a liquid crystal layer on a base substrate; and
 forming an anisotropic grating on a side of the liquid crystal layer distal to the base substrate and comprising a plurality of barriers and a plurality of slits arranged alternately, the anisotropic grating is configured to separate incident light into light of a first color, light of a second color, and light of a third color, and configured to emit the light of the first color, the light of the second color, and the light of the third color at different exit angles, respectively;
 wherein the anisotropic grating is formed to comprise an anisotropic optical material in the plurality of slits, the anisotropic optical material has a first refractive index for a transverse magnetic component of the incident light and a second refractive index for a transverse electric component of the incident light, the first refractive index being different from the second refractive index.

36. A method of fabricating a back light for a liquid crystal display panel, comprising forming an anisotropic grating;
 wherein forming the anisotropic grating comprises forming a plurality of barriers and a plurality of slits arranged alternately;
 the anisotropic grating is formed to separate incident light into light of a first color, light of a second color, and light of a third color, and formed to emit the light of the first color, the light of the second color, and the light of the third color at different exit angles, respectively; and
 the anisotropic grating is formed to include an anisotropic optical material in the plurality of slits, the anisotropic optical material has a first refractive index for a transverse magnetic component of the incident light and a second refractive index for a transverse electric component of the incident light, the first refractive index being different from the second refractive index.

* * * * *